June 14, 1960

J. MARTIN 2,940,702

PARACHUTE PACK RETAINING MEANS FOR USE WITH AN AIRCRAFT EJECTION SEAT

Filed Oct. 19, 1955

Inventor
James Martin
per Worth Wade
Attorney.

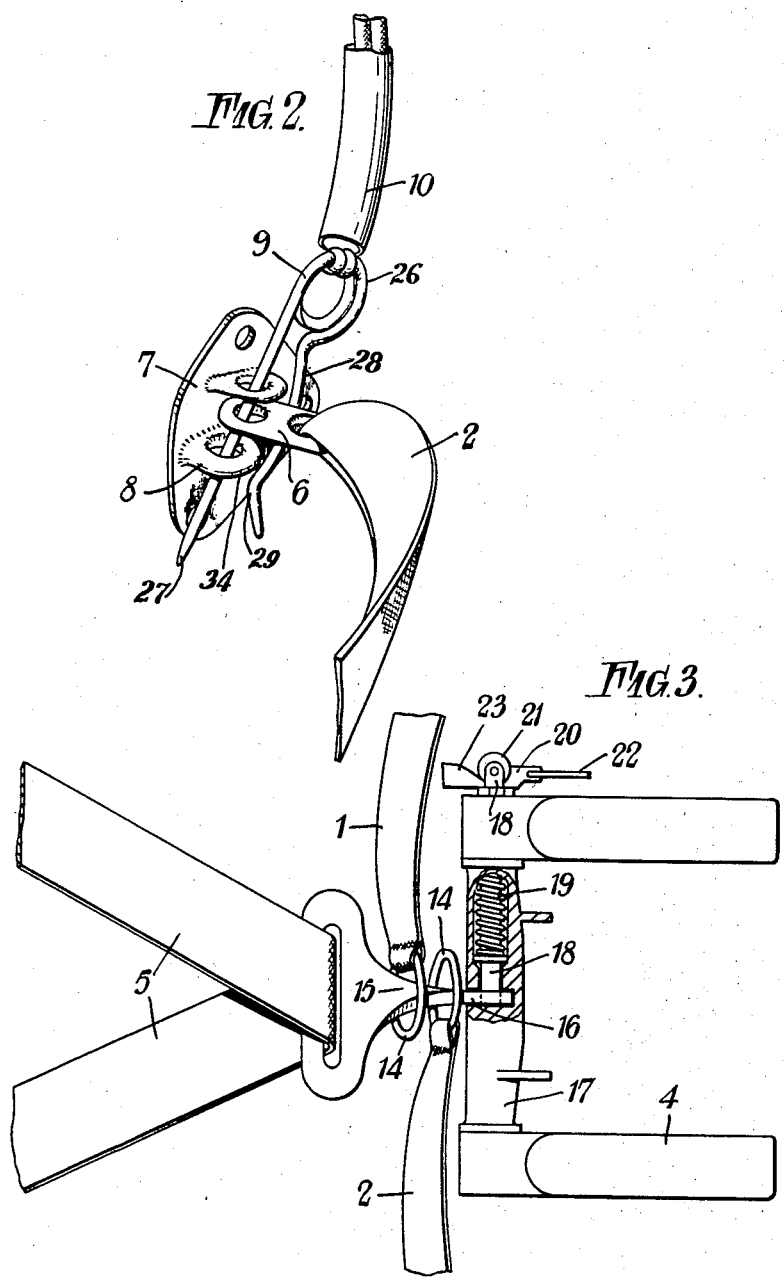

United States Patent Office 2,940,702
Patented June 14, 1960

2,940,702

PARACHUTE PACK RETAINING MEANS FOR USE WITH AN AIRCRAFT EJECTION SEAT

James Martin, Southlands Manor, Southlands Road, Denham, near Uxbridge, England

Filed Oct. 19, 1955, Ser. No. 541,411

3 Claims. (Cl. 244—141)

The invention relates to improvements in and relating to parachute pack retaining means for use with ejection seats for aircraft.

The pack retaining means may be used with conventional aircraft ejection seats such as those shown in my prior U.S. Patent 2,708,083, but the seat per se forms no essential part of the present invention.

One form of ejection seat comprises a frame on which the seat is mounted, an ejection gun operating to eject the seat and its frame along guide means, a drogue parachute, a main parachute enclosed in a pack, parachute harness, harness release mechanism, and means operable as the seat is ejected from an aircraft to carry out automatically and in correct sequence and timing the operations necessary to allow a pilot to descend on a main parachute. There is provided a blind or screen which is adapted to be drawn into position over the face of the pilot before, and to remain in position during, the launching of the seat and its occupant from the aircraft. Means are provided interconnecting the blind or screen with the firing mechanism or gun so that the act of drawing the blind or screen into position will actuate or release the firing mechanism of the ejection gun.

The present invention is characterised by parachute pack retaining means for use with ejection seats, comprising an inverted U-shaped parachute pack positioned against the seat back, a pair of vertically disposed pack straps having their upper ends releasably attached to the seat back, and their lower ends also releasably attached to the seat back at a point corresponding to the attachment of the safety harness shoulder straps, the point of attachment being located between the two dependent limbs of the pack, the releasable attachments being so arranged that for an automatic release the pack retaining straps are freed simultaneously at all attachment points, but for a manual release the pack retaining straps are freed only at the lower attachments.

The accompanying drawings illustrate an example of carrying into effect the invention.

In the drawings:

Fig. 2 is a perspective view showing one form of upper releasable attachment for the pack straps, and Fig. 3 shows one form of lower releasable attachment for the pack straps and the shoulder straps.

Figure 1:
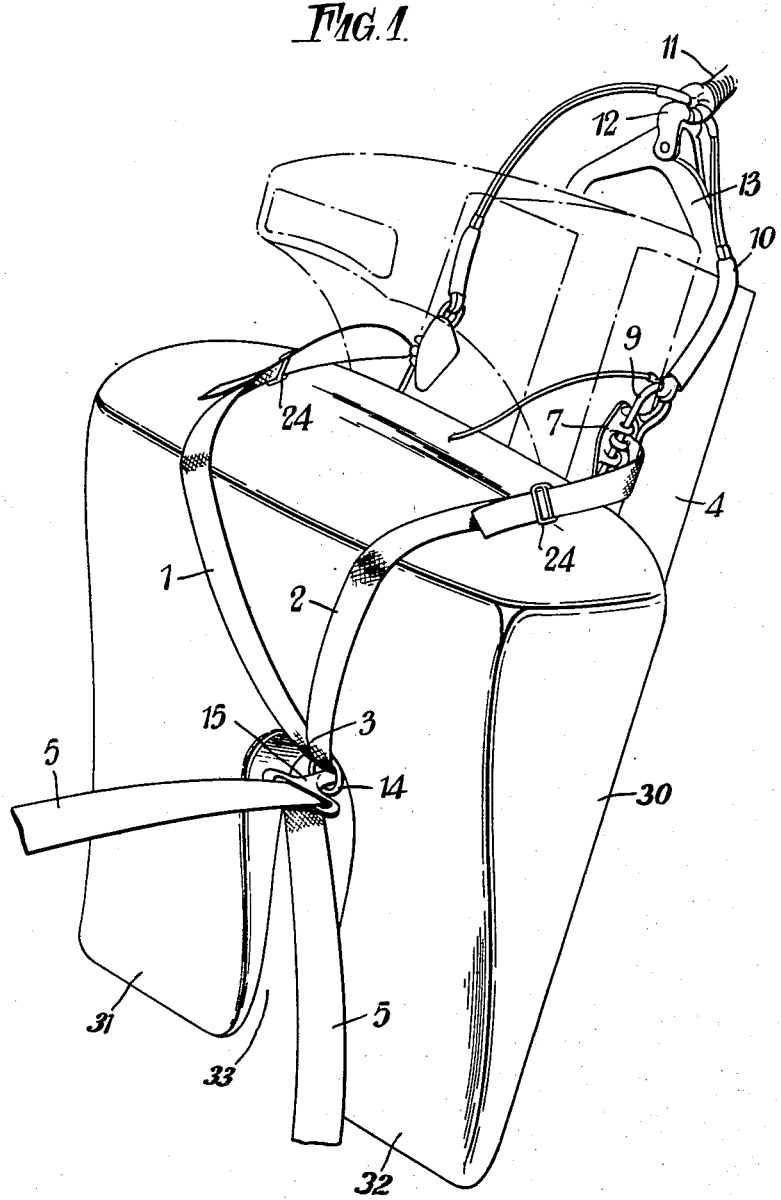
Fig. 1 is a perspective view of an ejection seat, parachute pack and harness.

It will be seen from the drawings that there are two pack retaining straps 1 and 2 so arranged that when they are attached to the seat structure, the contour of the pack straps is of generally triangular configuration, with the apex 3 pointing downwardly. As shown in Fig. 1, the parachute pack 30 has an inverted U shape and is positioned against the seat back 4. The two dependent limbs 31 and 32 of the pack 30 provide a space 33 through which the lower ends of the pack straps 1 and 2 and the lug 15 of the shoulder straps 5 may be attached to the seat back, the point of attachment being preferably at the upper end of the inverted U-shaped space 33 so that the pack is securely held in position.

The upper extremity of each strap 1 and 2 is releasably attached to the seat structure 4 by means of an apertured plate or lug member 6, see particularly Fig. 2. The seat structure carries a bracket 7 having outstanding apertured lugs 8 and a quick release retaining pin 9 is inserted through these lugs 8 and through the apertured point or lug 6, thus releasably attaching the upper extremities of the straps 1 and 2 to the seat structure. Each quick release retaining pin 9 is attached to one end of a line 10, the opposite extremity of the line 10 being attached to a drogue parachute line 11. The line 11 is also connected to a drogue parachute shackle 12. The shackle 12 is coupled to a scissors shackle 13 on the top beam of the seat 4. The shackles 12 and 13 are diagrammatically illustrated in the drawings but it is to be understood that their construction and operation are described and shown fully in prior Patent 2,708,083.

Fig. 2 illustrates that each of the straps 1 and 2 is normally detachably secured to the seat by aligning the hole in the member 6 with the holes in the lugs 8 and thereafter passing the retaining pin through these aligned holes. The pin 9 itself comprises a coil spring 26 having a straight end 27 forming a pin and an arched leg forming a spring loaded clip 28. Since the shoulder 29 of the clip 28 is located normally below the edge 34 of the lower of the lugs 8, the pin 9 is retained in the position shown until sufficient tension is exerted upwardly on the cable 10 to cause the arched leg of the pin to slip past the edge of the lugs 8.

Fig. 3 illustrates the lower extremity attachment for the strap 1. The lower end of each strap 1 and 2 has a link 14, through which a lug 15 normally extends. The lug 15 is provided with a slot 35 through which the safety harness shoulder straps 5 pass.

The lug member 15 has an apertured stem or spindle part 16 within which the plunger 18 is engageable to retain the lug member in place and attached to the seat 4.

To this end, it will be noted from Fig. 3 that the seat beam 17 is provided with a bore slidably receiving the plunger 18 and which plunger is under closing bias of a coil spring 19. The inner end of the plunger 18 engages in the hole of the stem 16 of lug 15 and normally anchors the shoulder straps 5 and, consequently, the pack retaining straps 1 and 2 of the seat.

The other end of the plunger 18 is under the control of a wedge-shaped sear 20 working through a slot in the plunger 18 beneath a roller 21, this roller being held against the sear by the spring 19. The forward end of the sear 20 receives the end of an actuating cable 22. The sear has an incline 23, so that a pull on the cable 22 will withdraw the sear 20 causing the roller 21 to ride up the incline 23 whereby the end of the plunger is withdrawn from the hole in the stem 16 of the lug member 15, thus releasing the lug 15 and the straps 1 and 2.

Each pack retaining strap may be made in one-piece or of sectional parts.

In the drawings these pack retaining straps are in one-piece and have adjustment buckles 24 to permit tightening and loosening. Furthermore the straps may also be released at this buckling point to permit removal of pack for servicing.

In the case of automatic release of the pack retaining straps from the seat, as when a seat is ejected from an aircraft, both the retaining pin 9 and the plunger 18 must be withdrawn simultaneously. This can be done in various ways under the control of the seat ejection and allied devices.

One way of withdrawing the retaining pin 9 is illustrated. In this arrangement, when the drogue shackle 12 is released from the scissors shackle 13 the drogue line 11 pulls the line 10 whereon the quick release pin 9 is withdrawn from engagement with the holes in the member 6 and the lugs and the upper ends of the pack retaining straps are freed from the seat.

At the same time the sear 20 is actuated, as by the time release mechanism described in my Patent No. 2,708,083 or by some other part of the seat ejection apparatus to withdraw the plunger 18 from the hole in the stem 16 of the lug member 15, whereupon the latter comes away from the seat and when freed therefrom allows the links 14 to slide off the lug 15 thus freeing the lower ends of the pack retaining straps from the seat.

In certain circumstances it may be an airman would require to manually release the parachute pack. This would be done by releasing only the lower ends of the pack retaining straps and the shoulder straps. For this purpose the sear 20 in addition to being under the control of the time release or other suitable mechanism, is also under the control of a manual release so that the sear can be actuated manually. One form of manual actuation is that described in my Patent No. 2,708,083 and referred to as a manual override.

It will be apparent that the invention can be variously modified and changed within the scope of the appendant claims.

I claim:

1. In an aircraft ejection seat having a back, an inverted U-shaped parachute pack positioned against said back, means for releasably securing an airman and said parachute pack to said seat back, said means comprising shoulder straps adapted to be passed over the shoulders of the airman when on said seat, a lug attached to said shoulder straps, a lock positioned on said seat back at a point between the dependent limbs of said parachute pack, said lock releasably securing said lug to said seat back, a pair of pack retaining straps passing substantially vertically over said pack, means for connecting the lower ends of said pack straps to said lug, said means being releasable when said lug is released, means for releasably attaching the upper ends of said pack straps to spaced points on said seat back, means connected to the last mentioned means to release the upper ends of said pack straps, and means connected to said lock to release said lug.

2. The combination recited in claim 1, in which the means for attaching the upper ends of said pack straps to said seat back comprises a bracket fixed to said seat back and having holed lugs thereon, a plate having a hole and attached to the upper end of said pack strap, a pin passing through the holes of the lugs and the hole in said plate, said means for releasing the upper ends of the pack straps being connected to said pin to withdraw the same from said holes.

3. The combination recited in claim 1, in which said lock comprises a ring attached to the end of each of said pack straps, and in which said lug comprises an extension having a hole therein, said extension passing through said rings, and a spring loaded pin fixed to said seat back and passing through the hole in said lug, said means for releasing the upper ends of the pack straps being connected to said pin to withdraw the same from said holes.

References Cited in the file of this patent

UNITED STATES PATENTS

| 247,823 | Hiller | Oct. 4, 1881 |
| 1,050,874 | Twombly | Jan. 21, 1913 |
| 2,655,329 | Martin | Oct. 13, 1953 |
| 2,708,083 | Martin | May 10, 1955 |

OTHER REFERENCES

"Aviation Week," April 20, 1953, p. 25.